United States Patent [19]

Hubbard

[11] 4,224,745
[45] Sep. 30, 1980

[54] TEACHING AID FOR HAIR SETTING AND COLORING

[76] Inventor: Tom W. Hubbard, 3319 Pembrook Dr., Sarasota, Fla. 33579

[21] Appl. No.: 955,911

[22] Filed: Oct. 30, 1978

[51] Int. Cl.³ .............................................. G09B 19/00
[52] U.S. Cl. ...................................................... 35/59
[58] Field of Search ........................ 35/59, 17; 46/172; 132/53

[56] References Cited

U.S. PATENT DOCUMENTS

| | | | |
|---|---|---|---|
| 1,387,161 | 8/1921 | Morrill | 35/59 |
| 2,774,184 | 12/1956 | Hefferan et al. | 35/17 X |
| 3,458,943 | 8/1969 | Trowbridge | 35/59 |
| 3,980,092 | 9/1976 | Garufi | 132/53 |

Primary Examiner—William H. Grieb
Attorney, Agent, or Firm—Hauke and Patalidis

[57] ABSTRACT

A teaching aid for teaching students the art of permanent hair setting and hair coloring. The teaching aid of the invention is in the form of a column-supported platform, the platform having a flat surface to which is removably attached a flat piece or swatch of material-simulating hair or preferably human hair. A thermostatically regulated electric heating element is disposed in the platform housing to maintain the temperature of the platform and of the swatch of hair to a normal body temperature.

4 Claims, 7 Drawing Figures

U.S. Patent  Sep. 30, 1980  4,224,745
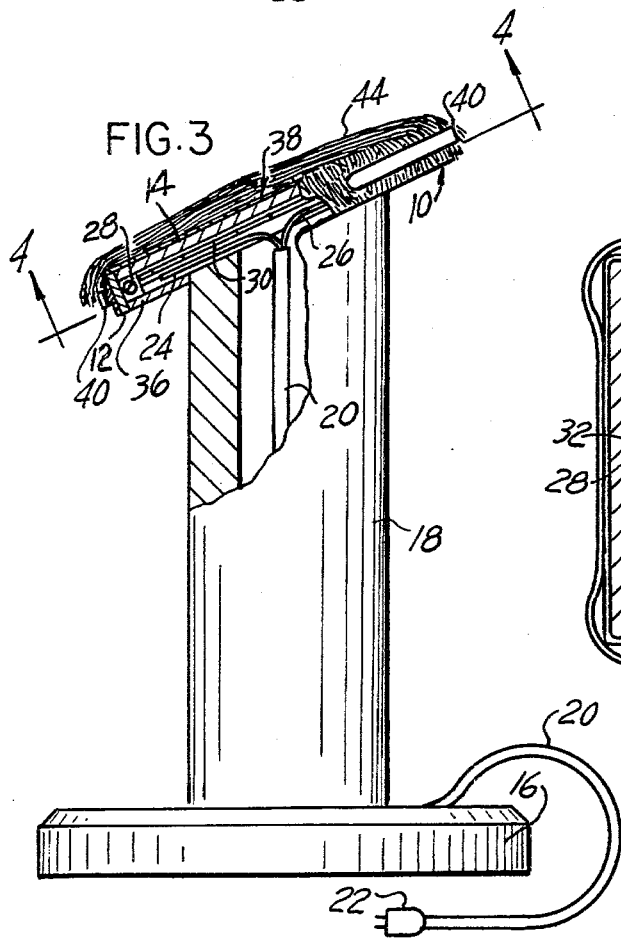
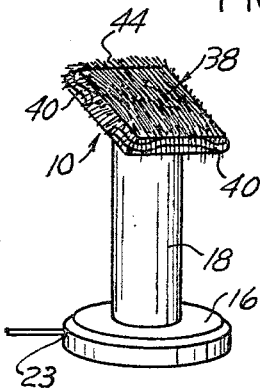
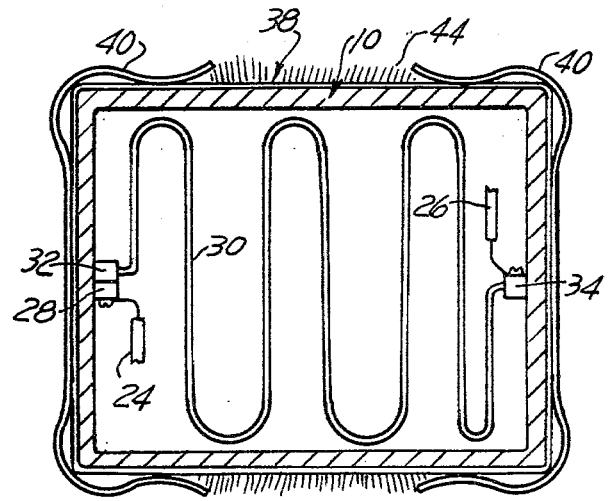
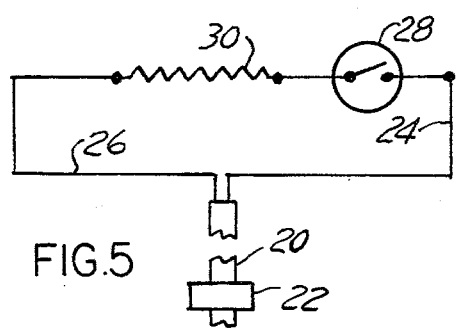
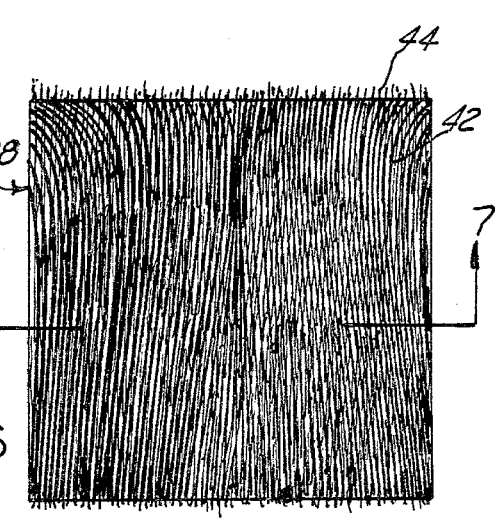

4,224,745

TEACHING AID FOR HAIR SETTING AND COLORING

BACKGROUND OF THE INVENTION

The present invention relates to teaching aids and more specifically to a teaching aid for teaching students the arts of permanent hair setting and hair coloring under simulated conditions which realistically duplicate actual conditions.

Teaching aids to teach students the art of hair styling and wig styling, and to enable students to practice, generally take the form of a model of a human head whose skull portion is covered by a wig or by a plurality of wig swatches as disclosed in U.S. Pat. No. 3,458,943, for example. Similar models have been used in the past to also demonstrate and practice the art of permanent hair setting and coloring. However, the use of such demonstration and training models provided with a relatively costly wig which, for the purpose of practicing permanent hair setting and hair coloring is preferably made of natural human hair, is very costly as the wig deteriorates very rapidly and must be replaced by a new substantially expensive wig after a relatively short period of time. More importantly yet, the demonstration and training model is incapable of duplicating actual conditions because the chemicals used for permanent hair setting and for hair coloring are formulated and compounded such as to take into consideration, and thus require, normal body heat to react and oxidize completely within the time periods prescribed for application of each chemical solution.

SUMMARY OF THE INVENTION

The present invention remedies the inconveniences of the prior art by providing a demonstration and training simulator for use in teaching and practicing the art of permanent hair setting and of hair coloring, eliminating entirely the use of costly shaped wigs, and capable of duplicating actual conditions by supplying heat within the range of normal body temperature to the swatch of hair being operated upon. The invention permits to use a flat piece or swatch of wig or toupee material applied to an electrically heated flat-top platform, whose temperature is thermostatically controlled within a narrow range conforming to normal body temperature, such as to faithfully duplicate the normal conditions under which hair is permanently set or colored. The flat pieces or swatches of hair may be as small as desired, such that a considerable number of demonstrations, tests and attempts by students to duplicate the results achieved by the instructor, can be accomplished in a relatively short period of time and at a relatively low cost.

The many objects and advantages of the present invention will become readily apparent to those skilled in the art when the following description of the best mode contemplated for practicing the invention is read in conjunction with the accompanying drawing wherein:

BRIEF DESCRIPTION OF THE DRAWING

FIG. 1 is a perspective view of a demonstration model or simulator for hair permanent set or coloring according to the present invention;

FIG. 2 is a view similar to FIG. 1 but showing the model or simulator provided with a flat piece or swatch of hair;

FIG. 3 is a side elevation view thereof with portions broken away to show the internal construction;

FIG. 4 is a transverse sectional view thereof along line 4—4 of FIG. 3;

FIG. 5 is an electrical schematic of the heating element thereof; and

FIGS. 6 and 7 are respectively a top plan view and a cross-sectional view of a flat piece of hair for use with the present invention.

DETAILED DESCRIPTION OF THE PREFERRED EMBODIMENT

The teaching and demonstration model or simulator of the present invention, as shown at FIGS. 1-3, comprises a platform 10 consisting of a closed housing 12 having a flat top surface 14. The platform housing 12 is supported, in the example of structure illustrated, from a base 16 by means of an upright tubular column or post 18. An electric cable or cord 20 is provided on one end with a conventional electric plug 22 for plugging into an electrical outlet. The electric cord 20 is passed through a slot or opening 23 in the base 16 and on the inside of the tubular support column or post 18. The two wires 24 and 26 of the electrical cord 20, FIGS. 3, 4 and 5, are connected through a thermostat, or thermally-actuated switch, 28 across a resistive electrical heating element 30. The heating element 30, FIGS. 3 and 4, is held by way of at least a pair of brackets 32 and 34 within the platform housing 12 and below the panel forming the top flat surface 14 of the platform housing 12, and the thermostat 28 is set such as to maintain the temperature of the platform housing within appropriate limits causing the top flat surface 14 of the platform 10 to be held at 100° F., ±2°, thus at a temperature substantially that of a human body.

As best shown at FIG. 3, the platform housing 12 is preferably a four-sided open base rectangular box fitted, at its open side, over a rectangular plate 36 fastened at the top of the support column 18, and placed at an angle such that the platform housing 12 is inclined relative to the horizontal for the purpose of providing a clear display of a flat piece or swatch 38 of hair material stretched over the top flat surface 14 of the platform housing 12. The flat piece or swatch 38 of hair material is held in position by any convenient fastening means such as a pair of plastic or metal U-shaped spring clips 40, adapted to engage and hold resiliently the sides of the flat piece or swatch 38 of hair material draped over the top flat surface 14 of the platform 10, with the sides of the flat piece or swatch 38 of hair material engaged with the side surfaces of the platform housing 12.

The platform housing 12, the plate 36, the column 18 and the base 16 may be made of any convenient materials such as metal, wood, and the like, and preferably they are made of plastic members assembled together by press-fitting, cementing, or by means of conventional fasteners, such as screws, not shown.

As illustrated at FIGS. 6 and 7, the flat piece or swatch 38 of hair material is of the same conventional structure as used for wigs or toupees, for example, and consists of a fabric or, preferably a plastic film base 42 in which is embedded the ends of a plurality of preferably human hair 44. It will be readily appreciated that the piece or swatch 38 of hair which, preferably, is a substantially square or rectangular flat piece or swatch may be made as small as convenient so as to be relatively low in cost, such that there will be no hesitancy to discard it after is has accomplished its purpose for demonstration, test and training in the art of hair setting and coloring. Typically, the flat piece or swatch 38 of hair may measure 5 in.×5 in. (12.5 cm.×12.5 cm.), or even less.

The teaching aid of the invention is used in the following manner. The teaching aid is placed for example on a table, resting on top of the table by way of its base 16, and the plug 22 is plugged into an electrical outlet. A piece or swatch 38 of hair material is attached to the top flat surface 14 of the platform housing 12 by means of the spring clips 40, and after the temperature of the top surface 14 has stabilized, which takes only a few seconds to a minute or two depending on the thickness and heat conductance of the wall of the platform housing 12 forming the top surface 14, the appropriate chemical solutions either for permanent hair setting or for hair coloring are applied to the hair of the flat piece or swatch 38 of hair material for the required periods of time in the appropriate sequence of application. For demonstrating or practicing permanent setting, enough strands of hair are available to apply several curlers. Because the surface 14 disposed below the flat piece or swatch 38 of hair is maintained at a regulated temperature substantially like that of a human body, actual conditions are realistically simulated, and the chemicals react under the same conditions and in the same environment as is the case during permanent setting or coloring of hair on a person. Although the flat piece or swatch 38 of hair material can obviously be re-used several times, it is a simple matter to remove it from the platform 10 and discard and replace it by a new piece or swatch of hair when necessary.

Having thus described the present invention by way of an example of structural embodiment thereof, modification whereof will be apparent to those skilled in the art, what is claimed as new is as follows:

I claim:

1. A model for teaching and learning the art of hair setting and hair coloring comprising a platform having a flat surface, a flat piece of hair material, means for attaching said flat piece of hair material to the flat surface of the platform and heating means maintaining the temperature of said flat surface at substantially human body temperature, wherein said heating means is a thermostatically-controlled electrical heating element.

2. The model of claim 1 wherein said platform is mounted on the top of a support column.

3. The model of claim 2 wherein said platform is inclined at an angle to the horizontal.

4. A method for teaching and practicing the art of hair permanent setting and hair coloring, said method comprising attaching a flat piece of hair material to a flat surface and maintaining said flat surface to substantially body temperature while applying chemicals to said hair material, wherein said flat surface is maintained to substantially body temperature by a thermostatically-controlled electrical heating element.

* * * * *